US007580766B1

(12) United States Patent  (10) Patent No.: US 7,580,766 B1
Sharma et al.  (45) Date of Patent: Aug. 25, 2009

(54) MANUFACTURING RESOURCE PLANNING BY ENTITY

(75) Inventors: Anil Kumar Sharma, Culver City, CA (US); Hajime Tamura, Fuchu (JP); Paul Miller, Marina Del Rey, CA (US); Quentin S. Brearley, Newbury Park, CA (US)

(73) Assignee: Glovia International, Inc., El Segundo, CA (US)

( * ) Notice: Subject to any disclaimer, the term of this patent is extended or adjusted under 35 U.S.C. 154(b) by 483 days.

(21) Appl. No.: 11/015,217

(22) Filed: Dec. 17, 2004

Related U.S. Application Data

(60) Provisional application No. 60/530,631, filed on Dec. 17, 2003.

(51) Int. Cl.
*G06F 19/00* (2006.01)
(52) U.S. Cl. ............................. 700/100; 700/16; 700/96; 700/99; 700/106; 705/28
(58) Field of Classification Search ................ 700/9, 700/14–16, 96, 97, 99–107, 121, 216; 705/28, 705/29
See application file for complete search history.

(56) References Cited

U.S. PATENT DOCUMENTS

| 5,193,065 | A | * | 3/1993 | Guerindon et al. ........... 700/106 |
| 5,268,838 | A | * | 12/1993 | Ito .............................. 700/99 |
| 5,630,070 | A |  | 5/1997 | Dietrich et al. ................ 705/8 |
| 5,699,259 | A | * | 12/1997 | Colman et al. ................ 700/99 |
| 5,787,000 | A | * | 7/1998 | Lilly et al. .................... 700/95 |
| 5,822,210 | A | * | 10/1998 | Kobayashi et al. ........... 700/121 |
| 6,141,647 | A |  | 10/2000 | Meijer et al. ................... 705/1 |
| 6,615,092 | B2 |  | 9/2003 | Bickley et al. ............... 700/99 |
| 6,629,008 | B2 |  | 9/2003 | Shiiba et al. ................ 700/100 |
| 6,915,275 | B2 |  | 7/2005 | Banerjee et al. .............. 705/26 |
| 6,934,594 | B2 |  | 8/2005 | Loring et al. ............... 700/100 |
| 2002/0103709 | A1 | * | 8/2002 | Anthony et al. ............... 705/22 |
| 2004/0117048 | A1 |  | 6/2004 | Wei ........................... 700/100 |
| 2004/0117227 | A1 |  | 6/2004 | Wei ............................. 705/7 |
| 2004/0148212 | A1 |  | 7/2004 | Wu et al. ....................... 705/8 |

OTHER PUBLICATIONS

Wacker, J.G., Lummus, R.R., "Sales Forecasting for Strategic Resource Planning," International Journal of Operations & Production Management 22, 9/10 (2002) 1014-1031, 2002.

* cited by examiner

*Primary Examiner*—Sean P Shechtman
(74) *Attorney, Agent, or Firm*—Baker Botts L.L.P.

(57) ABSTRACT

A method for manufacturing resource planning includes identifying multiple logical entities within a manufacturing facility; receiving supply information for each of the logical entities, the supply information for a particular logical entity including current and projected future inventories of resources assigned to the particular logical entity for use in manufacturing products; receiving demand information associated with manufacture of a requested product; identifying resources for use in manufacturing the requested product; and scheduling manufacture of the requested product using the identified resources at least one of the logical entities at least partially based on the supply information and the demand information.

18 Claims, 4 Drawing Sheets

| | | Component A | Component B | Component C |
|---|---|---|---|---|
| Factory 1 | Line 1 | 83756 | 43956 | 65481 |
| | Line 2 | 112980 | 23975 | 145838 |
| | Line 3 | 78432 | 85929 | 28512 |
| | Line 4 | 33254 | 45923 | 40008 |
| Factory 2 | Line 1 | 118563 | 132878 | 99725 |
| | Line 2 | 28567 | 978944 | 47620 |
| | Line 3 | 56850 | 100000 | 83651 |
| | Line 4 | 12839 | 43271 | 74754 |
| | Line 5 | 87609 | 58276 | 72956 |
| | Line 6 | 81054 | 94276 | 86934 |

Allocation table - Component A

| | | Priorities | Allocation % | Max Lot Sizes | Preferred Sources |
|---|---|---|---|---|---|
| Factory 1 | Line 1 | 2 | 20% | 100,000 | Vendor A |
| | Line 2 | 1 | 50% | 150,000 | Internal X |
| | Line 3 | 3 | 20% | 100,000 | Vendor B |
| | Line 4 | 4 | 10% | 50,000 | Vendor B |
| Factory 2 | Line 1 | 1 | 25% | 150,000 | Supplier Y |
| | Line 2 | 2 | 25% | 150,000 | Supplier Y |
| | Line 3 | 3 | 20% | 100,000 | Vendor A |
| | Line 4 | 4 | 20% | 100,000 | Vendor A |
| | Line 5 | 5 | 5% | 100,000 | Internal X |
| | Line 6 | 6 | 5% | 100,000 | Internal X |

Update

FIG. 4

| | | Component A | Component B | Component C |
|---|---|---|---|---|
| Factory 1 | Line 1 | 83756 | 43956 | 65481 |
| | Line 2 | 112980 | 23975 | 145838 |
| | Line 3 | 78432 | 85929 | 28512 |
| | Line 4 | 33254 | 45923 | 40008 |
| Factory 2 | Line 1 | 118563 | 132878 | 99725 |
| | Line 2 | 28567 | 978944 | 47620 |
| | Line 3 | 56850 | 100000 | 83651 |
| | Line 4 | 12839 | 43271 | 74754 |
| | Line 5 | 87609 | 58276 | 72956 |
| | Line 6 | 81054 | 94276 | 86934 |

Capacity Table — 9/17/04 — Update

FIG. 5

MANUFACTURING RESOURCE PLANNING BY ENTITY

RELATED APPLICATION

This application claims priority to U.S. Provisional Patent Application Ser. No. 60/530,631 filed Dec. 17, 2003, entitled Global Business Management.

TECHNICAL FIELD OF THE INVENTION

The present invention relates generally to manufacturing resource planning, and, more particularly, to manufacturing resource planning by entity.

BACKGROUND OF THE INVENTION

Within manufacturing systems, supply and demand for resources used during manufacturing may be managed by a manufacturing resource planning application. In traditional systems, the manufacturing resource planning application compares factory-wide demand with factory-wide supplies of resources. However, traditional systems have proven to be inadequate in various respects.

SUMMARY OF THE INVENTION

In accordance with the present invention, techniques for manufacturing resource planning are provided. According to particular embodiments, these techniques enable manufacturing resource planning by entity.

According to a particular embodiment, a method for manufacturing resource planning includes identifying multiple logical entities within a manufacturing facility; receiving supply information for each of the logical entities, the supply information for a particular logical entity including current and projected future inventories of resources assigned to the particular logical entity for use in manufacturing products; receiving demand information associated with manufacture of a requested product; identifying resources for use in manufacturing the requested product; and scheduling manufacture of the requested product using the identified resources at least one of the logical entities at least partially based on the supply information and the demand information.

Embodiments of the invention provide various technical advantages. According to particular embodiments, these techniques may eliminate or reduce inefficiencies and other problems associated with traditional methods of manufacturing resource planning. These techniques may provide for increased granularity with respect to entities within a local manufacturing facility or within multiple distributed manufacturing facilities. Increased granularity may enable more accurate and effective planning of manufacturing activities. According to particular embodiments, these techniques support entity-by-entity tracking of resource availability and entity-by-entity planning of resource usage within a manufacturing facility. These techniques may account for unused but unavailable supply with respect to resources dedicated to particular entities within a facility. Demand may be netted against available resources at each entity within the manufacturing facility. Furthermore, resources may be ordered at appropriate times and in appropriate amounts to maintain predetermined levels of resources at particular entities within a manufacturing facility. According to particular embodiments, these techniques may result in efficient allocation of resources resulting in smaller inventories and lower overhead costs.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which:

FIG. 3 illustrates a graphical user interface for interacting with an allocation table stored within a planning tool;

DETAILED DESCRIPTION OF THE INVENTION

Figure 1:
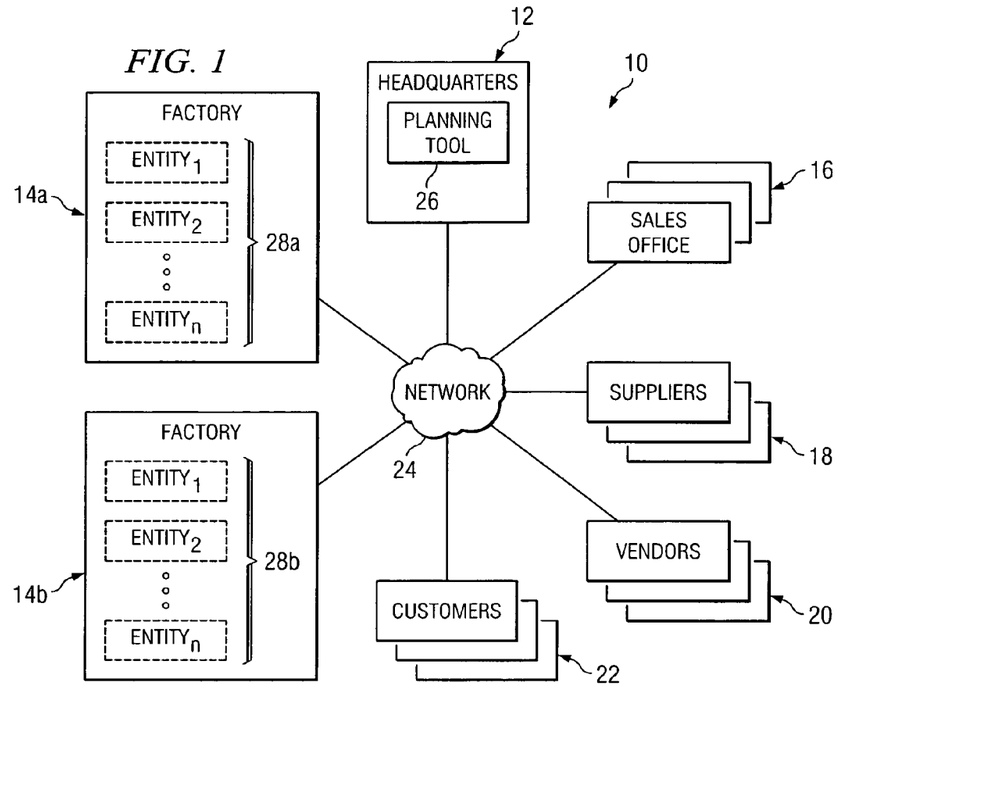
FIG. 1 illustrates a manufacturing system.

FIG. 1 illustrates a manufacturing system, indicated generally at 10, that includes a headquarters 12, factories 14, sales offices 16, suppliers 18, vendors 20, and customers 22 interconnected through a network 24. Headquarters 12 includes a planning tool 26 for use in managing manufacturing resources and planning manufacturing activities in manufacturing system 10. Factories 14 include entities 28. In general, planning tool 26 manages manufacturing resources and plans manufacturing activities by tracking and planning resource availability and usage with respect to entities 28 on an entity-by-entity basis. In particular, planning tool 26 may group manufacturing equipment within factories 14 into entities 28 to provide for increased granularity with respect to manufacturing resource planning. For example, planning tool 26 may order resources from suppliers 18 and/or vendors 20 for particular entities 28 within factories 14 based on projected future supplies of resources at the particular entities 28. Similarly, planning tool 26 may assign production to particular entities 28 in response to demand received from sales offices 16 and/or customers 22 based on projected future supplies of resources at the particular entities 28.

Headquarters 12 represents a centralized business office for managing and planning aspects of manufacturing activities occurring within manufacturing system 10. Factories 14 represent facilities involved in the manufacture of products. Sales offices 16 represent distributed business offices for generating demand for the manufacture of products by factories 14. Suppliers 18 and vendors 20 represent entities that supply resources to factories 14. Customers 22 represent entities requesting products manufactured by factories 14. Headquarters 12, factories 14, sales offices 16, suppliers 18, vendors 20, and customers 22 each include appropriate hardware, software, and controlling logic capable of communicating with other elements of manufacturing system 10 through network 24.

Network 24 represents any suitable collection of hardware, software, and controlling logic capable of interconnecting elements coupled to network 24. In a particular embodiment, network 24 may include one or multiple networks, such as a telecommunications network, a local area network (LAN), a wide area network (WAN), the Internet, and/or any other appropriate networks. Thus, network 24 provides infrastructure to support communications within manufacturing system 10.

Planning tool 26 represents any suitable collection of hardware, software, and controlling logic for managing manufacturing resources and planning manufacturing activities within manufacturing system 10 on an entity-by-entity basis. Thus, according to a particular embodiment, planning tool 26 is a software application loaded onto a general purpose computer.

Entities 28 are logical constructs each representing individual manufacturing equipment or collections of manufacturing equipment that use resources to manufacture products. Entities 28 may logically collect manufacturing equipment into one entity 28 if the equipment utilizes or acts upon at least one common resource to the exclusion of other manufacturing equipment. Thus, entities 28 logically organize resources within factories 14. For example, each entity 28 may be a collection of machines forming a production line. Alternatively or in addition, entities 28 may include individual machines or any other individual or group of manufacturing equipment using a particular resource. Note that, as used herein, the term resources refers to raw materials, components, fuel, time, energy, manpower, and/or any other supply used by elements of manufacturing system 10 to manufacture products. Furthermore, while illustrated as being located within factories 14, entities 28 may be located in any appropriate location in manufacturing system 10.

In operation, planning tool 26 identifies entities 28 within factories 14 in order to manage manufacturing resources and plan manufacturing activities in manufacturing system 10 on an entity-by-entity basis. Planning tool 26 may identify entities 28 in response to a user of planning tool 26 indicating to planning tool 26 the identities of entities 28. Planning tool 26 may associate identifiers with entities 28 in order to differentiate between entities 28. According to a particular embodiment, entities 28 may be manufacturing lines having multiple manufacturing machines. Entities 28 may also be individual machines in factories 14.

Planning tool 26 stores supply information for each of entities 28. As used herein, supply information includes information identifying or affecting inventories of resources at facilities within manufacturing system 10. For example, the supply information may include current inventories of resources. The supply information may also include projected future inventories of resources. Projections of future inventories may be based on plans for acquiring and/or using resources on future dates. For example, resources may be ordered from suppliers 18 and/or vendors 20 for future delivery. Resources may also be scheduled for consumption or use according to a production plan. According to particular embodiments, the supply information is input into planning tool 26 by a user of planning tool 26. According to other embodiments, supply information may be communicated to planning tool 26 through network 24. For example, supply information may be communicated to planning tool 26 from factories 14.

In some circumstances, resources may be delivered to factories 14 on reels or in other forms for installation and use in a production environment. For example, reels of prefabricated electronic components may be installed on a production line and/or in a machine within factory 14. In these situations, cost and time may counsel against moving the resources from one machine or production line to another. Therefore, in many circumstances reels of resources are effectively dedicated to particular machines or production lines. In these circumstances, use of entities 28 by planning tool 26 may be particularly helpful since entities 28 allow planning tool 26 to account for the availability of the resources at the particular entity 28 while accounting for the unavailability of the resources with regard to other entities 28 within the same factory 14.

Planning tool 26 may determine that resources should be ordered based on the supply information. For example, planning tool 26 may analyze the supply information associated with factories 14 and determine that particular resources are running low. Resources may be analyzed in an overall manner or with respect to individual entities 28. Planning tool 26 may automatically order or suggest a materials resource planner order resources in response to analyzing the supply information.

Resources ordered for factories 14 may be allocated to factories 14 and/or to particular entities 28. Allocation of resources may be determined using allocation rules. Various allocation rules may be utilized by planning tool 26. For example, entities 28 may be assigned priorities and resources may be assigned to particular entities 28 based on relative priorities. For example, a particular production line may be loaded with particular resources before other production lines. According to particular embodiments, a higher priority entity 28 may be assigned resources until the capacity of the higher priority entity 28 is reached or some inventory goal for the higher priority entity 28 is met. Thus, in these embodiments lower priority entities 28 may not be assigned resources until higher priority entities 28 are allocated sufficient resources. Another allocation rule may distribute resources according to allocation percentages. For example, resources may be evenly split between entities 28. As another example, differing percentages may be assigned to particular entities 28 and resources may be assigned to entities 28 within the particular factory 14 according to the allocation percentages.

Planning tool 26 may utilize other allocation rules. For example, some resources may be ordered and allocated among entities 28 according to lot size. For example, particularly with prefabricated electronic components, resources are often purchased by reel. A reel may be purchased or assigned to a particular entity 28 in response to a reel at the particular entity 28 running low on components. Allocation of the reel of components to the particular entity 28 indicates to planning tool 26 that the components are dedicated to use by the particular entity 28 and will not be available for use by other entities 28. That is, while all remaining components on the reel technically remain in inventory, the components are not available to any other entity 28. In addition, resources may be allocated to entities 28 based on the source of the resources. Similarly, resources may be ordered based on the entity 28 intended to use the resources. For example, particular entities 28 may be associated with preferred sources for resources. Thus, planning tool 26 may allocate particular resources ordered from particular sources, such as suppliers 18 and vendors 20, to particular entities 28.

Planning tool 26 may receive demand information from a user of planning tool 26 or another element of manufacturing system 10. As used herein, demand information includes information identifying actual or projected activities that will consume, utilize, and/or transform resources at facilities within manufacturing system 10. For example, the demand information may include sales of products, where the sales of the products will require production of those products and where the production will consume, utilize, and/or transform resources stored at factories 14. Projections of future production may be based on sales forecasts and other estimates of resource usage on future dates. For example, demand information may be received by planning tool 26 from sales offices 16 and/or customers 22.

Planning tool 26 may schedule production at particular entities 28 and/or order resources for particular entities 28 using the supply information and the demand information. According to a particular embodiment, planning tool 26 may generate a bill of material in response to receiving an order for a product. The bill of material may identify resources used to manufacture the requested product. To plan the manufacture of the requested product, planning tool 26 may analyze the supply information and select particular entities 28 with sufficient resources. For example, planning tool 26 may identify particular entities 28 with sufficient resources on particular days for manufacturing the requested product. In addition, planning tool 26 may order additional resources for selected entities 28 in response to planning production of the requested product at the selected entities 28. Planning tool 26 may order resources from suppliers 18 and/or vendors 20 in order for a particular entity 28 to have sufficient resources to manufacture the requested product on a particular date.

After scheduling manufacture of a requested product or ordering resources, the supply information may be updated. Planning tool 26 may update the supply information to record the effect of consumption, use, transformation, and/or ordering of the resources on the inventory of the resources. In this manner, the supply information may represent an up-to-date projection of inventories of resources available for use in manufacturing products at particular entities 28 within factories 14. The supply information may be stored in a capacity table or other device for storing data. Supply information may therefore be used to determine when and how much resources to order as well as when and where to schedule production.

Thus, planning tool 26 may manage manufacturing resources and plan manufacturing activities on an entity-by-entity basis. Supply information related to resources utilized by factories 14 may be organized with respect to entities 28 within factories 14. This supply information may be used by planning tool 26 to order resources from suppliers 18 and/or vendors 20. The supply information may also be used to schedule manufacturing activities in response to demand information received from sales offices 16 and customers 22.

Note that while illustrated as being located within headquarters 12, planning tool 26 may be utilized in various locations within manufacturing system 10. For example, planning tool 26 may be located within factory 14, sales office 16, or any other appropriate location. Furthermore, planning tool 26 may be distributed among various elements of manufacturing system 10.

Figure 2:
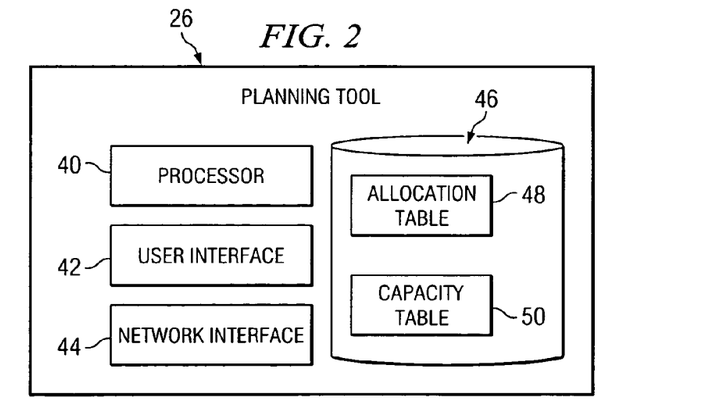
FIG. 2 illustrates functional components of a planning tool that manages manufacturing resources and plans manufacturing activities in a manufacturing system.

FIG. 2 is a block diagram illustrating exemplary functional components of planning tool 26. In the embodiment illustrated, planning tool 26 includes a processor 40, a user interface 42, a network interface 44, and a memory 46. These functional components can operate to provide for manufacturing resource planning by entity.

Processor 40 represents any hardware and/or logic elements operable to control and process information. Processor 40 controls the operation and administration of elements within planning tool 26. For example, processor 40 operates to process information received from user interface 42, network interface 44, and memory 46. Thus, processor 40 may be a programmable logic device, a controller, and/or any other suitable processing device.

User interface 42 represents hardware and/or software for inputting information into planning tool 26 and outputting information from planning tool 26. For example, user interface 42 may receive input such as supply information and/or demand information from a user of planning tool 26. User interface 42 may also display information such as supply and demand information to a user of planning tool 26. Thus, user interface 42 may include hardware components such as keyboard, mouse, display, and/or other appropriate devices as well as associated software for inputting and outputting information.

Network interface 44 represents hardware and/or software operable to communicate information to and receive information from devices coupled to planning tool 26. For example, network interface 44 may communicate with factories 14, sales offices 16, suppliers 18, vendors 20, and customers 22. Thus, network interface 44 includes any suitable hardware or controlling logic to communicate information to or from elements coupled to planning tool 26.

Memory 46 represents any one or a combination of volatile or non-volatile local or remote devices suitable for storing information. Memory 46 stores, either permanently or temporarily, data or other information for processing by processor 40 and communicating using user interface 42 and/or network interface 44. For example, memory 46 may include random access memory (RAM), read only memory (ROM), magnetic storage devices, optical storage devices, or any other suitable information storage device or a combination of these devices. As illustrated, memory 46 may include one or more memory modules.

Allocation table 48 represents a database structure for storing allocation rules associated with entities 28. For example, allocation table 48 may include allocation priorities, allocation percentages, and other information and settings used by planning tool 26 to allocate supply and demand to particular entities 28. Capacity table 50 represents a database structure for storing supply information related to entities 28. For example, capacity table 50 may identify current and projected future inventories of resources identified by entity 28.

In operation, planning tool 26 manages manufacturing resources and plans manufacturing activities within manufacturing system 10. Supply and demand information as well as allocation settings communicated to planning tool 26 by other elements of manufacturing system 10 may be received by planning tool 26 using network interface 44. Alternatively or in addition, a user of planning tool 26 may use user interface 42 to input supply and demand information as well as settings for allocation rules into planning tool 26. The supply and demand information as well as the allocation settings may be stored in memory 46. For example, data may be stored in allocation table 48 and capacity table 50 in memory 46. Processor 40 may associate data stored in memory 46 with particular entities 28. For example, resources dedicated for use by particular manufacturing equipment may be represented as associated with a particular entity 28 within the capacity table 50. Furthermore, scheduled production which would reduce amounts of resources at particular entities 28 may also be represented in capacity table 50.

By associating resources and allocation settings with entities 28, processor 40 may match demand with supply on an entity-by-entity basis. Processor 40 may analyze the data stored in memory 46 to determine desirable allocations of resources and production schedules. These allocations of resources and production schedules may be determined by processor 40 and communicated to appropriate elements of manufacturing system 10 using network interface 44. For example, processor 40 may automatically assign demand to particular entities 28 based on the demand information and the supply information in capacity table 50. Alternatively or in addition, processor 40 may assist a user in determining desirable allocations of resources and production schedules.

For example, a user of planning tool 26 may analyze demand information and supply information as represented in capacity table 50 to determine appropriate entities 28 for production of requested products. For example, a user may access and view capacity table 50 using user interface 42. Thus, production at particular entities 28 may be scheduled. In response to scheduled activity within factories 14, supply information and capacity table 50 may be updated. Furthermore, scheduling instructions and other data may be communicated to factories 14 through network interface 44.

By associating resources and allocation settings with entities 28, processor 40 may also determine or assist a user in determining on an entity-by-entity basis when to order resources and how many resources should be ordered. For example, the user may analyze capacity table 50 to identify particular entities 28 that may require additional resources on a particular date. In response, the user may use planning tool 26 to order additional resources. For example, orders may be communicated using network interface 44 through network 24 to suppliers 18 and/or vendors 20. In addition, ordered resources may be assigned to particular logical enterprises 28 and supply information stored in capacity table 50 may be updated in response to the orders.

According to particular embodiments, processor 40 may assign ordered resources to manufacturing equipment according to allocation rules represented in allocation table 48. For example, processor 40 may allocate resources to particular entities 28 according to priorities and/or allocation percentages identified in allocation table 48. Furthermore, processor 40 may order resources from particular sources identified in allocation table 48 as being associated with particular entities 28. For example, preferred sources such as particular vendors or internal sources may be identified. In addition, processor 40 may order resources according to maximum lot sizes associated with particular entities 28. For example, maximum sizes of reels may be identified in allocation table 48.

Thus, the elements of planning tool 26 may act to manage manufacturing resources and plan manufacturing activities on an entity-by-entity basis. Planning tool 26 may assist in the ordering of manufacturing resources and in the scheduling of manufacturing activities on an entity-by-entity basis.

While this example includes specific functional components for planning tool 26, planning tool 26 may include any collection and arrangement of components, including some or all of the enumerated functional components, for manufacturing resource planning by entity. Moreover, planning tool 26 contemplates implementing each of the functional components using any suitable combination and arrangement of hardware and/or logic, and implementing any of the functionalities using a computer program stored on a computer readable medium. Furthermore, planning tool 26 may be implemented as a stand-alone device, or aspects of planning tool 26 may be distributed among various devices.

FIG. 3 illustrates interactive window 60, which may be used to view and update allocation table 48. Allocation table 48 indicates allocation rules for a particular resource. As illustrated in the title bar of interactive window 60, the particular resource may be a particular component. Allocation rules may be utilized by planning tool 26 and/or a user of planning tool 26 to manage manufacturing resources and plan manufacturing activities on an entity-by-entity basis.

Allocation table 48 includes various allocation rules 62. A first allocation rule involves priorities 64. Priorities 64 indicate relative priorities to be used when distributing resources among entities 72. When priorities 64 are utilized, resources will be allocated to higher priority entities 72 before resources are allocated to lower priority entities 72. Another type of allocation rule is indicated by allocation percentages 66. When allocation percentages 66 are utilized, entities 72 will receive resources in accordance with their respective allocation percentage 66. Another type of allocation rule is indicated by maximum lot sizes 68. When utilized, maximum lot sizes 68 may identify sizes of reels of components utilized by particular entities 72. Yet another allocation rule involves preferred sources 70. When utilized, preferred sources 70 identify preferred suppliers 18, vendors 20, or internal sources of components for particular entities 72.

Since allocation table 48 stores various allocation rules for entities 72, check boxes 74 identify which allocation rules are currently being applied by planning tool 26. For example, in the embodiment illustrated, check boxes 74 indicate that planning tool 26 will utilize priorities 64 and maximum lot sizes 68 when determining how component A will be distributed among entities 72.

A user may interact with interactive window 60 to update allocation rules settings shown in allocation table 48. After updating allocation table 48, a user may select update button 76 to store the settings.

Thus, interactive window 60 represents one embodiment of a tool that allows a user to view, update, and use allocation rules for particular resources in manufacturing system 10. Note that while particular allocation rules and settings have been illustrated, various types of allocation rules may be utilized as appropriate.

Figure 4:
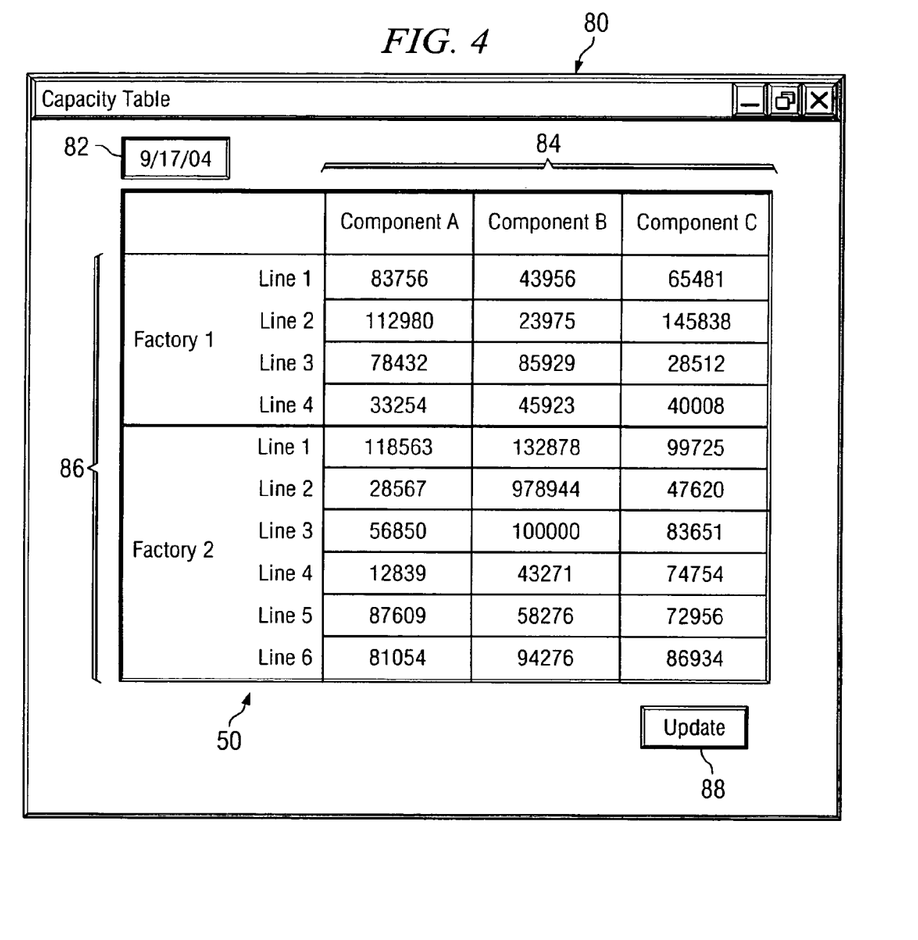
FIG. 4 illustrates a graphical user interface for interacting with a capacity table stored within a planning tool.

FIG. 4 illustrates interactive window 80, which may be used to view and update capacity table 50. Capacity table 50 indicates current and projected future allocations of resources associated with manufacturing system 10. Allocations of resources may be utilized by planning tool 26 and/or a user of planning tool 26 to manage manufacturing resources and plan manufacturing activities on an entity-by-entity basis.

Capacity table 50 includes a date 82 that indicates the particular date associated with the resource allocations shown in capacity table 50. While illustrated as a particular day, date 82 may be any appropriate measure of time such as an hour, day, week, month, or other time period. Capacity table 50 indicates allocations of particular components 84 to particular entities 86 as of date 82.

Data in capacity table 50 may be determined by planning tool 26 by analyzing supply and demand information. For example, previously scheduled production at particular entities 86 as well as previously ordered resources allocated to particular entities 86 may be used to complete capacity table 50. According to particular embodiments, a user of interactive window 80 may input information into capacity table 50 using interactive window 80. Alternatively or in addition, information may be obtained through network 24 from other elements of manufacturing system 10.

Planning tool 26 may utilize various algorithms and methodologies to analyze data in capacity table 50 to determine when to order resources for particular entities 86, how to allocate resources among entities 86, and/or how to allocate demand among entities 86. Planning tool 26 may seek to achieve particular goals. For example, a goal may be to equalize supply and demand within time periods to minimize inventory, to hold inventory constant, or to increase inventory. Planning tool 26 may indicate suggested actions to a user of interactive window 80 to achieve goals while utilizing allocation rules identified in allocation table 48. Alternatively or in addition, planning tool 26 may automatically order resources and/or allocate demand and supply among entities 86 based on an analysis of the data in capacity table 50 and allocation table 48.

A user may interact with interactive window 80 to update allocation of resources shown in capacity table 50. After updating capacity table 50, a user may select update button 88 to store the data.

Thus, interactive window 80 represents one embodiment of a tool that allows a user to view, update, and use data identifying allocations of resources in manufacturing system 10.

Figure 5:
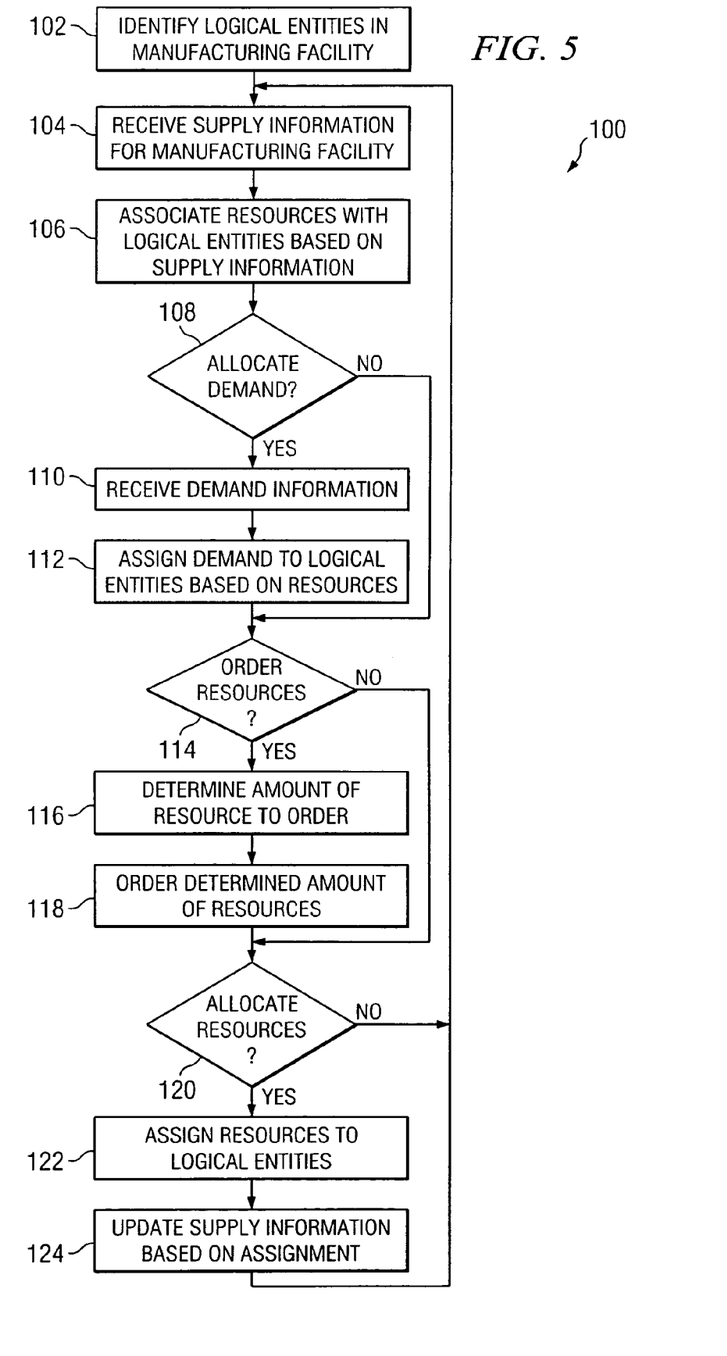
FIG. 5 is a flowchart illustrating a method of managing manufacturing resources and planning manufacturing activities on an entity-by-entity basis.

FIG. 5 is a flowchart illustrating a method 100 for managing manufacturing resources and planning manufacturing activities on an entity-by-entity basis. Planning tool 26 identifies entities in a manufacturing facility such as factory 14 at step 102. Planning tool 26 receives supply information for the manufacturing facility at step 104. For example, supply information may be communicated to planning tool 26 from remote elements of manufacturing system 10 through network 24. Alternatively or in addition, supply information may be input into planning tool 26 by a user of planning tool 26. Planning tool 26 associates resources with entities based on the supply information at step 106. For example, resources may be allocated to particular entities due to various factors such as installation of reels of components on particular machines.

Planning tool 26 determines whether to allocate demand at step 108. For example, a user of planning tool 26 may determine to cause planning tool 26 to allocate demand to particular entities. If planning tool 26 determines to allocate demand, planning tool 26 receives demand information at step 110. Demand information may be communicated to planning tool 26 from a user of planning tool 26. Alternatively or in addition, demand information may be communicated to planning tool 26 from remote elements of manufacturing system 10, such as sales offices 16 and customers 22. Planning tool 26 assigns demand to particular entities based on resource allocation identified in the supply information at step 112. For example, planning tool 26 may schedule production of a requested product at a particular entity having available resources to manufacture the requested product at a certain date.

Planning tool 26 determines whether to order resources at step 114. For example, a user of planning tool 26 may determine to cause planning tool 26 to order resources. If planning tool 26 determines to order resources, planning tool 26 determines an amount of resources to order at step 116. The amount of resources to order may be based on an analysis of data in capacity table 50. For example, capacity table 50 may show that resources are projected to run out at a particular entity on a particular date. Planning tool 26 may recognize this projection and determine an amount of resource to order for that particular entity so that the entity will not run out of resources. Next, at step 118 planning tool 26 orders the determined amount of resources. The resources may be ordered for delivery on a particular date to one or more particular entities. While the previous steps indicate that planning tool 26 orders the resources, alternatively or in addition, planning tool 26 may suggest to a user of planning tool 26 to actually order resources.

Planning tool 26 determines whether to allocate resources at step 120. For example, a user of planning tool 26 may determine to cause planning tool 26 to allocate resources. If planning tool 26 determines to allocate resources, planning tool 26 assigns resources to entities at step 122. Planning tool 26 may utilize various allocation rules 48 to assign resources. As discussed above, planning tool 26 may utilize a priority system, allocation percentages, and/or any other appropriate allocation rules 48 for assigning resources to particular entities. Furthermore, allocation of resources may reflect installation of physical resources such as reels of components on production lines and/or manufacturing machines. Alternatively or in addition, allocation of resources by planning tool 26 may cause a command to be communicated to the appropriate factory 14 indicating that particular resources have been allocated to particular manufacturing equipment. Planning tool 26 updates the supply information based on the allocation of resources at step 124. By updating the supply information, planning tool 26 maintains an up-to-date record of inventories of resources at particular entities. Up-to-date supply information may be used, as described above, to identify where to allocate demand, when to order resources, and where to allocate ordered resources within manufacturing system 10.

Thus, method 100 provides for manufacturing resource planning by entity. Manufacturing resources may be managed on an entity-by-entity basis, and manufacturing plans may be prepared on an entity-by-entity basis.

The preceding flowchart illustrates a particular method used to manage manufacturing resources and plan manufacturing activities. However, this flowchart illustrates only an exemplary method of operation, and the present invention contemplates any suitable techniques, elements, and applications for performing these functions. Thus, many of the steps in the flowchart may take place simultaneously and/or in different orders than as shown. In addition, methods may include additional steps or fewer steps, so long as the methods remain appropriate. Moreover, one or more elements of manufacturing system 10 may work independently and/or in conjunction with other elements to manage manufacturing resources and plan manufacturing activities.

Although the present invention has been described in several embodiments, a myriad of changes or modifications may be suggested to one skilled in the art, and it is intended that the present invention encompass such changes and modifications as fall within the present appended claims.

The invention claimed is:

1. A method for manufacturing resource planning, comprising:
   identifying a plurality of logical entities within a manufacturing facility;
   receiving supply information for each of the logical entities, the supply information for a particular logical entity including current and projected future inventories of resources assigned to the particular logical entity for use in manufacturing products;
   receiving demand information associated with manufacture of a requested product;
   comparing, for each of the logical entities, the supply information for the resources assigned to the respective logical entity with the demand information;
   selecting one of the logical entities at least partially based on the comparisons; and
   scheduling manufacture of the requested product using the resources at the selected one of the logical entities;
   wherein for at least some of the resources the assignment of the resources to the particular logical entity indicates that the resources are unavailable for use by other logical entities.

2. The method of claim 1, further comprising:
   ordering resources for use by the selected one of the logical entities;
   assigning the ordered resources to the selected one of the logical entities; and updating the supply information associated with the selected one of the logical entities to reflect the scheduled manufacture and the assignment of the ordered resources.

3. The method of claim 1, further comprising:
ordering resources for use in manufacturing products at the logical entities;
assigning the ordered resources to particular logical entities according to an allocation rule; and
updating the supply information associated with the particular logical entities to reflect the assignment of the ordered resources.

4. The method of claim 3, wherein assigning the ordered resources to the particular logical entities according to the allocation rule comprises:
associating each of the particular logical entities with a relative priority; and
assigning the ordered resources to the particular logical entities according to the relative priorities.

5. The method of claim 3, wherein assigning the ordered resources to the particular logical entities according to the allocation rule comprises:
associating each of the particular logical entities with an allocation percentage; and
assigning the ordered resources to the particular logical entities according to the allocation percentages.

6. The method of claim 1, wherein the logical entities are production lines, the resources are electrical components supplied to the manufacturing facility on reels, and the reels are physically connected to machines on the production lines.

7. A device for manufacturing resource planning, comprising:
an interface operable to receive supply information for each of a plurality of logical entities within a manufacturing facility, the supply information for a particular logical entity including current and projected future inventories of resources assigned to the particular logical entity for use in manufacturing products, and demand information associated with manufacture of a requested product; and
a processor operable to couple to the interface, identify the logical entities, compare, for each of the identified logical entities, the supply information for the resources assigned to the respective identified logical entity with the demand information, select one of the identified logical entities at least partially based on the comparisons, and schedule manufacture of the requested product using the resources at the selected one of the identified logical entities;
wherein for at least some of the resources the assignment of the resources to the particular logical entity indicates that the resources are unavailable for use by other logical entities.

8. The device of claim 7, wherein the processor is further operable to:
order resources for use by the selected one of the logical entities;
assign the ordered resources to the selected one of the logical entities; and
update the supply information associated with the selected one of the logical entities to reflect the scheduled manufacture and the assignment of the ordered resources.

9. The device of claim 7, wherein the processor is further operable to:
order resources for use in manufacturing products at the logical entities;
assign the ordered resources to particular logical entities according to an allocation rule; and
update the supply information associated with the particular logical entities to reflect the assignment of the ordered resources.

10. The device of claim 9, wherein assigning the ordered resources to the particular logical entities according to the allocation rule comprises:
associating each of the particular logical entities with a relative priority; and
assigning the ordered resources to the particular logical entities according to the relative priorities.

11. The device of claim 9, wherein assigning the ordered resources to the particular logical entities according to the allocation rule comprises:
associating each of the particular logical entities with an allocation percentage; and
assigning the ordered resources to the particular logical entities according to the allocation percentages.

12. The device of claim 7, wherein the logical entities are production lines, the resources are electrical components supplied to the manufacturing facility on reels, and the reels are physically connected to machines on the production lines.

13. Logic for manufacturing resource planning, the logic encoded in media and operable when executed to:
identify a plurality of logical entities within a manufacturing facility;
receive supply information for each of the logical entities, the supply information for a particular logical entity including current and projected future inventories of resources assigned to the particular logical entity for use in manufacturing products;
receive demand information associated with manufacture of a requested product;
compare, for each of the logical entities, the supply information for the resources assigned to the respective logical entity with the demand information;
select one of the logical entities at least partially based on the comparisons; and
schedule manufacture of the requested product using the resources at the selected one of the logical entities;
wherein for at least some of the resources the assignment of the resources to the particular logical entity indicates that the resources are unavailable for use by other logical entities.

14. The logic of claim 13, further operable when executed to:
order resources for use by the selected one of the logical entities;
assign the ordered resources to the selected one of the logical entities; and
update the supply information associated with the selected one of the logical entities to reflect the scheduled manufacture and the assignment of the ordered resources.

15. The logic of claim 13, further operable when executed to:
order resources for use in manufacturing products at the logical entities;
assign the ordered resources to particular logical entities according to an allocation rule; and
update the supply information associated with the particular logical entities to reflect the assignment of the ordered resources.

16. The logic of claim 15, wherein assigning the ordered resources to the particular logical entities according to the allocation rule comprises:

associating each of the particular logical entities with a relative priority; and assigning the ordered resources to the particular logical entities according to the relative priorities.

17. The logic of claim 15, wherein assigning the ordered resources to the particular logical entities according to the allocation rule comprises:

associating each of the particular logical entities with an allocation percentage; and assigning the ordered resources to the particular logical entities according to the allocation percentages.

18. The logic of claim 13, wherein the logical entities are production lines, the resources are electrical components supplied to the manufacturing facility on reels, and the reels are physically connected to machines on the production lines.

* * * * *

UNITED STATES PATENT AND TRADEMARK OFFICE
CERTIFICATE OF CORRECTION

PATENT NO. : 7,580,766 B1 Page 1 of 1
APPLICATION NO. : 11/015217
DATED : August 25, 2009
INVENTOR(S) : Sharma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Fourteenth Day of September, 2010

David J. Kappos
*Director of the United States Patent and Trademark Office*